Nov. 19, 1929.   R. P. DUNMIRE   1,736,149
CONDUIT FITTING
Filed Oct. 30, 1925

Russell P. Dunmire
INVENTOR.

BY
ATTORNEYS.

Patented Nov. 19, 1929

1,736,149

UNITED STATES PATENT OFFICE

RUSSELL P. DUNMIRE, OF ERIE, PENNSYLVANIA, ASSIGNOR TO ERIE MALLEABLE IRON COMPANY, OF ERIE, PENNSYLVANIA, A CORPORATION OF PENNSYLVANIA

CONDUIT FITTING

Application filed October 30, 1925. Serial No. 65,825.

This invention is directed to conduit fittings designed for use with threadless conduits and is particularly directed to the manner of securing such conduits in the fitting.

The invention is illustrated in the accompanying drawings as follows:—

Figure 1:
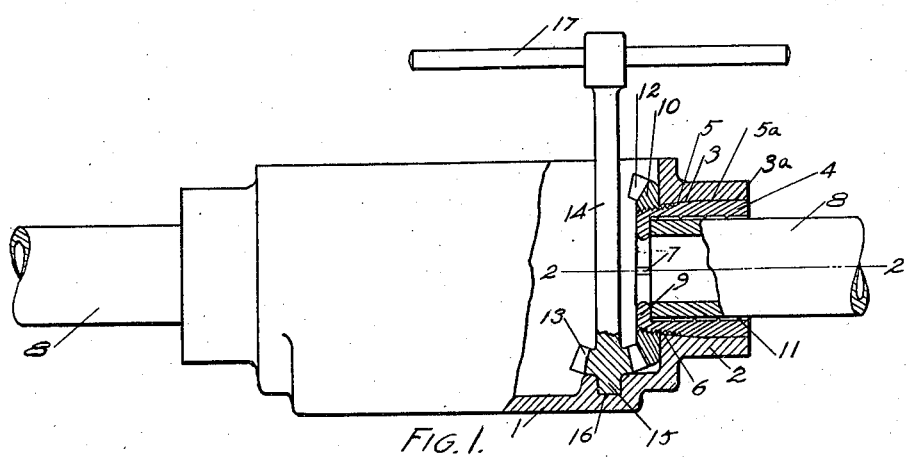
Fig. 1 shows a side elevation of an exemplification of a fitting in the form of a conduit box, the box being partly in section on the line 1—1 in Fig. 2.
Figures 2, 3:
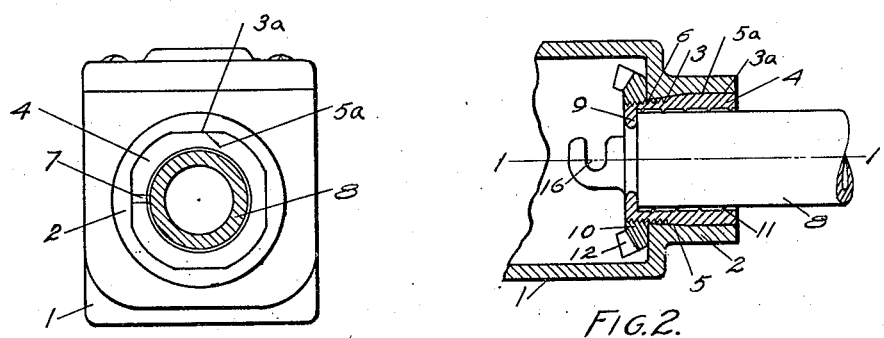
Fig. 2 is a section on the line 2—2 in Fig. 1.

Fig. 3 an end elevation of the box.

Figure 4:
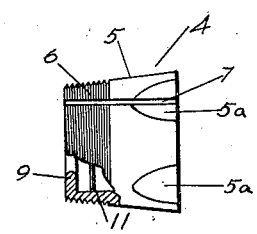

Fig. 4 a side elevation of a contracting sleeve.

1 marks the box body. This is provided with a conduit-receiving extension 2, the opening of which is tapered at 3.

A contractible sleeve 4 is arranged in the opening in the extension 2. It has a tapered exterior surface 5 conforming to the surface 3. It is also screw-threaded at 6 at its inner end, this screw thread being preferably tapered in continuation of the taper 5. The sleeve has a longitudinal slot 7 extending through it which permits it to contract on an inserted conduit 8. It is also provided with a guard shoulder 9 at its inner end against which the end of the conduit abuts.

A nut 10 is screwed on the screw-threaded end of the sleeve and is adapted, when tightened, to force the sleeve longitudinally in the tapered opening, thus contracting the sleeve into clamping engagement with the conduit, the walls of the sleeve being preferably provided with indenting protuberances 11 adapted to indent an enamel surface on the conduit so as to assure an electrical connection between the parts of the fitting and the conduit.

It is desirable to place the nut 10 within the body of the box but ordinarily this is inconvenient so far as the operation of the nut is concerned. With the present invention this is largely obviated as follows: The nut has a gear 12 formed upon it and the gear 13 is adapted to mesh with the gear 12, these being miter gears as shown. The gear 13 is mounted on a key stem 14, the key stem having a projection 15 which extends into a guide socket 16 in the body. The stem 14 is provided with a handle 17 by means of which the key may be turned. The walls of the extension 2 have the flat portions 3ª and the outer surfaces of the sleeve 4 have the flat portions 5ª which engage the flat portions 3ª and prevent the sleeve from turning in the opening in the extension.

When it is desired to clamp the conduit in place, the conduit is placed in a normally expanded sleeve, the nut started on the end of the sleeve and the end of the key is placed in the socket 16 bringing the gear 13 in mesh with the gear 12. Under these conditions the nut may be readily turned by rotating the key with sufficient force to securely clamp the conduit in the fitting. After the nut is fully set to place the key is removed and the nut is thus entirely housed within the fitting and occupies very little space within the guard shoulder end of the sleeve.

What I claim as new is:—

In a conduit fitting, the combination of a body having an open side, a conduit receiving opening therein and a key socket opposite the open side at the side of the opening; a slotted contractible sleeve in the opening, said sleeve being tapered and in wedging engagement with the walls of the opening and having its inner end the smaller and screwthreaded; a nut within the body on the screwthreaded inner end having a gear thereon; and a key journaled in the socket and having a gear engaging the gear on the nut.

In testimony whereof I have hereunto set my hand.

RUSSELL P. DUNMIRE.